Dec. 4, 1962 H. HÜRLIMANN ET AL 3,067,405
METHOD OF REMOTELY CONTROLLING ELECTRIC SWITCHING ARRANGEMENTS
BY MEANS OF MAINS-SUPERPOSITION CENTRAL REMOTE
CONTROL INSTALLATIONS AND ARRANGEMENT
FOR CARRYING OUT THE METHOD
Filed Nov. 26, 1956 3 Sheets-Sheet 1
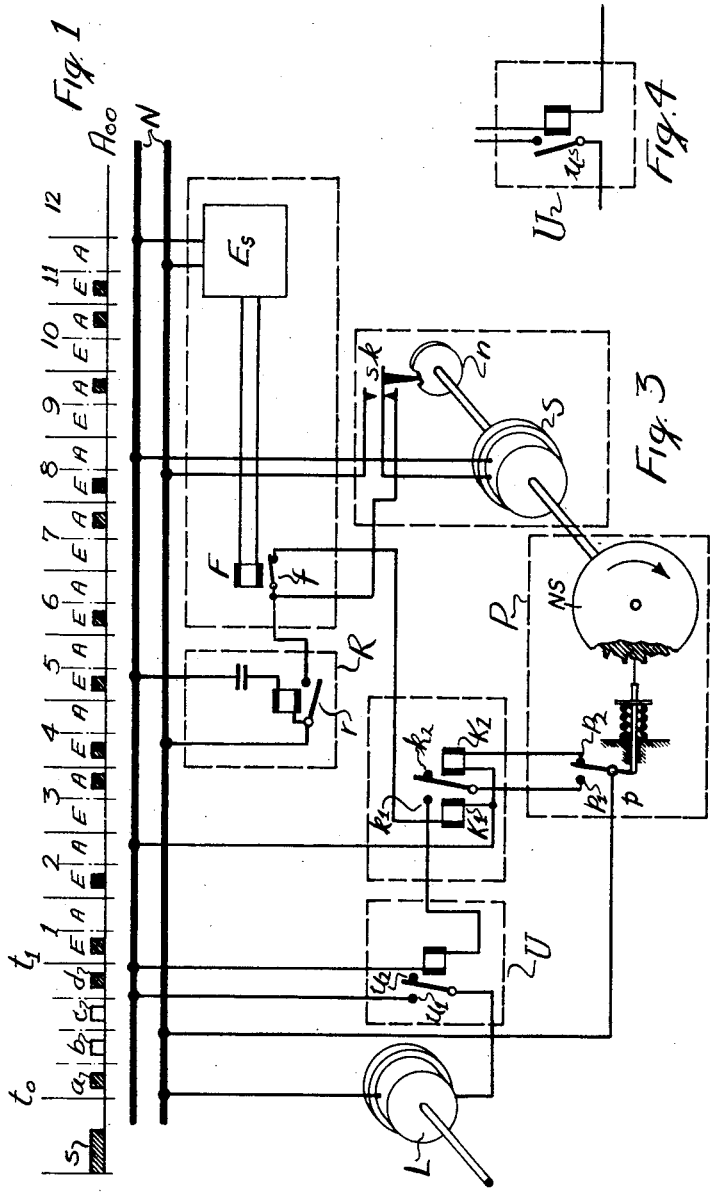
INVENTORS
Hans Hurlimann
Paul Hauri
By-
Morgan, Finnegan, Durham
& Pine

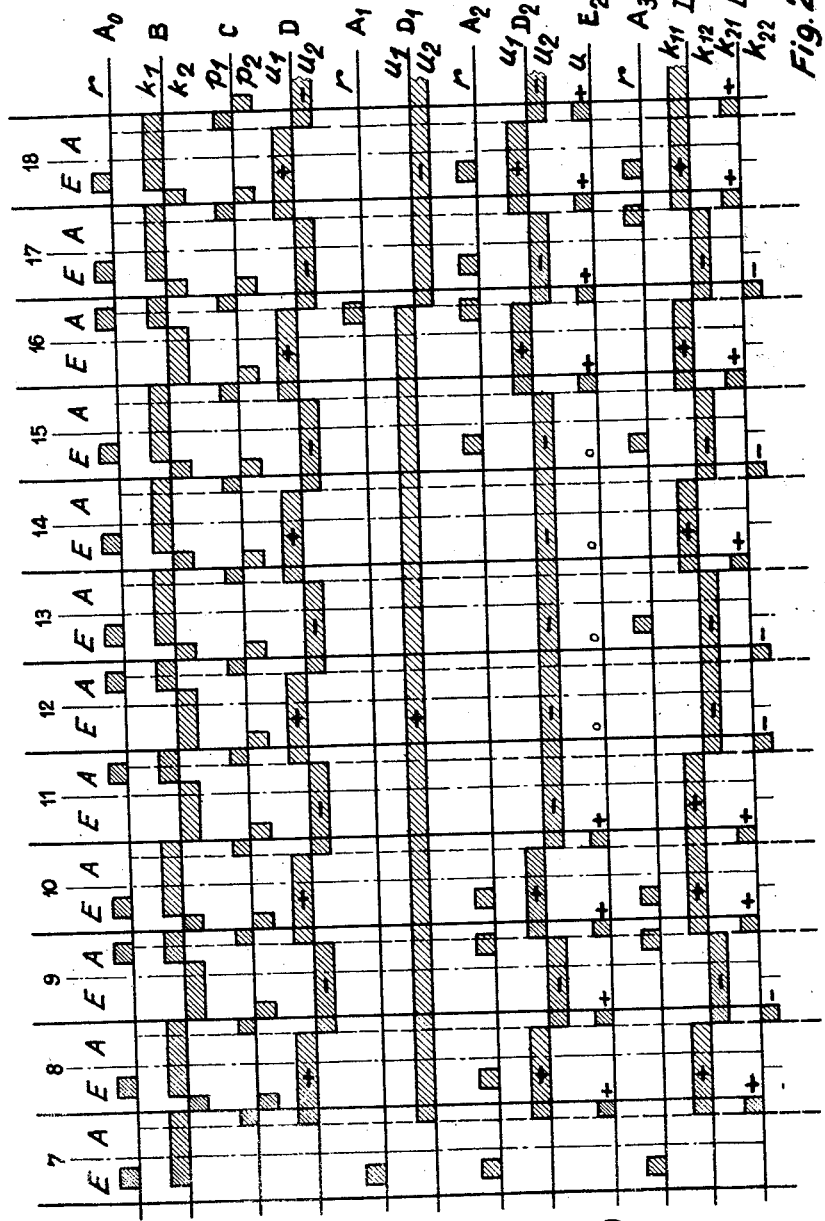

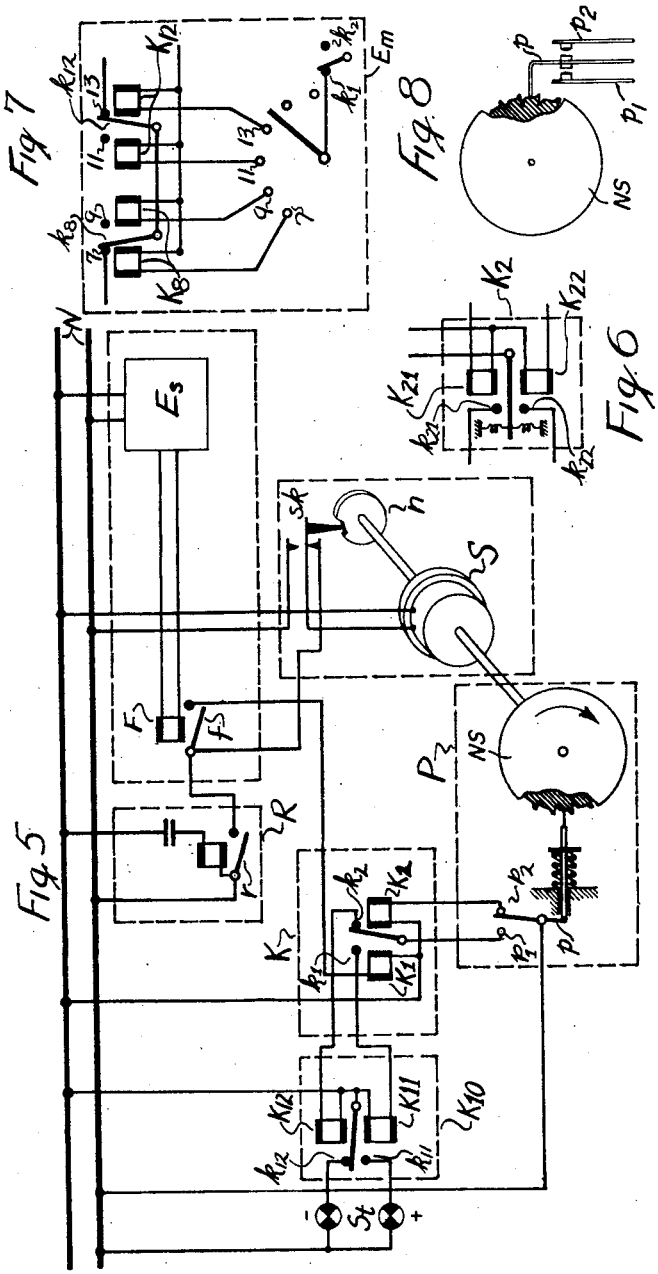

United States Patent Office 3,067,405
Patented Dec. 4, 1962

3,067,405
METHOD OF REMOTELY CONTROLLING ELECTRIC SWITCHING ARRANGEMENTS BY MEANS OF MAINS-SUPERPOSITION CENTRAL REMOTE CONTROL INSTALLATIONS AND ARRANGEMENT FOR CARRYING OUT THE METHOD
Hans Hürlimann, Baar, Zug, and Paul Hauri, Zug, Switzerland, assignors to Landis & Gyr, A.G., Zug, Switzerland, a body corporate of Switzerland
Filed Nov. 26, 1956, Ser. No. 624,298
Claims priority, application Switzerland Nov. 26, 1955
11 Claims. (Cl. 340—164)

As is known, central remote-control installations, also called broadcast control installations, serve to send switching orders from a control station to all points of a network for the distribution of electric energy either for changing over the tariff of meters, or for switching on and off loads, for example boilers, furnaces, street lighting and the like, or for controlling oil-break switches. It is known for this purpose to transmit audio-frequency impulses to the network from a transmitter at the control station, the stations to be controlled comprising receivers which respond to predetermined signals and carry out the required switching operations. The most common of the various known central remote-control systems are based on the time interval method, in which a series of order impulses follow a starter impulse on the time axis. These order impulses are generally generated by a synchronous selector acting as an emitter which acts on the network in known manner through an audio-frequency transmitter. The receivers are generally selectors which rotate synchronously with the mains frequency and whose selecting contacts correspond with the contacts of the synchronous emitter.

FIGURE 1 shows an impulse diagram of the method outlined in the foregoing. The order impulses acting on receiving arrangements known per se are allocated to a starter impulse $s$ on the time axis. Generally speaking, a distinction is drawn between direct order transmission and indirect order transmission. In the digram, the hatched impulses along $A_{00}$ are provided for direct orders from the time $t_1$. By "direct orders" are meant orders which directly initiate the desired switching operations through a switch associated with a synchronous contact. In the case of indirect orders, a group of impulses is generally formed and a combination is selected from this group. The actual switch for the desired switching operation can only be operated when the chain of switches associated with the corresponding synchronous positions are closed in the correct sequence. In the diagram $A_{00}$ of FIGURE 1, for example, such impulse combinations consist of the impulses $a$, $b$, $c$ and $d$ between the times $t_0$ and $t_1$. Since it is desired to utilize the combinations possible in such groups (in the case of four impulses there are $2^4=16$), these impulses naturally cannot be employed for the direct order transmission.

The direct order impulses hatched in FIG. 1 are combined in known manner to form so-called double signals, that is to say, there are allocated to each direct double signal 1, 2, 3, 4, 5 . . . one direct order impulse "on" (E) and one direct order impulse "off" (A). Since it is desired to switch each switching operation either "on" or "off," only one of the direct impulses of the pair is sent for the double signal concerned in each program transmission. It is known that when, for example, it is desired only to switch the individual order 6 to "on," it is advantageous in transmitting the program for this order to repeat simultaneously all the other orders of a series in their actual state.

FIGURE 1 shows at the time $t_1$ such a direct order repetition program through the double signals 1, 2, 3, 4, 5 . . . As is known, individual orders of the direct order series 1, 2, 3, 4 . . . or the entire series may be allocated to a group $a$, $b$, $c$, $d$. . . . In the latter case, however, each receiving arrangement must be provided with a group selecting arrangement.

The essential feature of the direct order impulse series is consequently not modified by the allocation to a group, since the allocation to no group is merely identical with the allocation to the group combination 0, 0, 0 . . . 0, that is to say, to the transmission of no group impulse. The allocation to a group merely involves a complication of the construction of the receiving arrangement, without otherwise essentially affecting the direct order transmission. Since this is not considered of interest in by far the greater number of cases, endeavors are made to reduce the direct order series to the simplest possible form. The number of possible orders of a direct order series, on the other hand, is naturally limited to the sum of the orders of this series, and it is therefore desirable to produce from a direct order series additional possibilities for special orders within the scope of the direct order series, regardless of whether it is a question of a direct order series with or without an allocated group feature. As is known, this can be done by repeating the direct order series normally in its actual state. In exceptional cases, however, certain departures are made from this normal repetition series (normal order program).

The present invention is concerned with such a method of remotely controlling electrical switching devices by means of mainsuperposition central remote control installations, also called broadcast control installations, which operate in accordance with the synchronous selector principle, in such manner that order impulses associated in time with the start impulse are sent, the impulses being at least partially combined in pairs to form double signals more especially for direct orders, which method is characterized by the fact that a test is made to ascertain whether one of the two impulses of the double-signal impulse pair is present in each double impulse of the direct order series, and that, with the aid of this test, which is a test of transmission and of the suppression of normal orders of the direct order repetition program, overriding impulses are produced for controlling special orders.

The invention further illustrates the arrangement for carrying out methods according to the invention, which arrangement is characterized by the fact that the impulses arriving at a receiving apparatus actuate a holding relay which is adapted to be returned after a particular time by a second holding relay, the testing of the position of the contact of the first holding relay and the return to the contact of the second holding relay being effected by means of a program-controlled make-and-break contact.

The method according to the invention and the arrangement according to the invention for carrying out the said method will be more fully explained by means of examples with reference to FIGURES 2 to 8, in which:

FIGURE 2 shows various impulse diagrams,

FIGURE 3 is a circuit diagram of a receiving arrangement,

FIGURE 4 shows a modified form of the circuit arrangement according to FIGURE 3, FIGURE 5 is a circuit diagram of the receiving arrangement, FIGURE 6 shows a modified form of the circuit arrangement of FIGURE 5, FIGURE 7 shows a modified form of the circuit arrangement according to FIGURE 5, and FIGURE 8 shows a cam contact.

The diagram A of FIGURE 2 shows a section of the direct order program from the time $t_7$, as already described with reference to FIGURE 1.

In diagram A of FIGURE 2, the impulses are specially drawn as to show the correspondence between the impulses and the closing times of a contact r of the resonant relay input circuit of a receiving arrangement (see the right-hand end of the diagram). For testing the double signals by the method according to the invention, it is particularly advantageous to arrange that, when one of the two impulses of the double signal is present, this impulse is lengthened to extend into a testing time zone between the end of the second impulse of the pair and the end of the double-signal interval, so that the presence of voltage during this testing time zone can be used as a double signal for indicating the presence of at least one of the two impulses of the pair in each double-signal interval. This lengthening of the time interval of the E or A order impulse is illustrated in diagram B of FIGURE 2. The presence of voltage in the testing time zones at the end of each impulse interval is represented in diagram C by $p_1$. This diagram also shows that immediately at commencement of the next interval a change-back to readiness for testing, designated by $p_2$, is effected. An overriding impulse generator, for example U, can then be actuated with the double-signal testing feature designated by $p_1$ in diagram C. If, for example, this overriding impulse generator is a change-over relay, there is produced therewith an overriding impulse diagram, as shown at D in FIGURE 2. In this figure, for example, the change-over relay U is driven positive in the presence of the direct order impulse E of the double signal 7. In the presence of an impulse E in the double signal 8, the change-over relay is driven negative. In the presence of the direct order A of the double signal 9, the relay is again driven positive, and so on.

A further example in which the impulse generator of higher order is a change-over relay, is shown by diagrams $A_1$ and $D_1$ of FIGURE 2, in which it is assumed that the direct order impulse E of the double signal 7 is present, that the direct order repetition impulses are suppressed throughout the double signals 8, 9, 10, 11, 12, 13, 14 and 15, that the direct order repetition impulse is again present in the double signal 16, and that the further repetition impulses are again suppressed. An overriding impulse diagram order $D_1$ is then produced. If the change-over relay acts, for example, on the driving motor of an air-raid warning siren, so that the latter periodically sounds and stops in accordance with diagram D in step with the length of a double-signal time interval, the siren gives a continuous tone from the instant of the end of the double signal 7 and stops again at the end of the double signal 16.

This example shows that it is thus possible to solve airraid warning problems at any time with the aid of the normal direct order programs in central remote control installations. More especially, such an alarm may be immediately started even during transmission of a normal order cycle. The example shows the further obvious advantage that, from the transmitting arrangement, the alarm rhythm of the sirens can be changed as desired at any time by a particular chosen method of transmitting repetition impulses and suppressing them. If the repetition impulses of the double signals 11, 12, 13 and 14 of diagram $A_0$ are suppressed as illustrated in diagram $A_2$, an overriding impulse diagram according to $D_2$ is obtained when the change-over relay is employed as an overriding impulse generator.

However, if a voltage relay operating from a zero position is employed as the overriding impulse generator, an overriding impulse diagram according to $E_2$ is obtained.

The diagrams $A_3$ and $D_3$ show an example in which the overriding impulse generator is a switching relay. An overriding impulse diagram according to $D_3$ is then obtained. However, if a polarized relay operating from a zero position is employed as the overriding impulse generator, an overriding impulse diagram $E_3$ is obtained, the construction of which is similar to that of a telegraph code.

It is thus possible to control, for example, a printing telegraph arrangement, or the like. However, it is of special interest in this connection that the double-signal features of the overriding impulse diagram act at least partially on an impulse combination receiving arrangement operating synchronously with the double-signal pitch. It is obvious that an extremely large number of additional overriding orders can thus be produced without any special steps having to be applied to the normal receiving arrangements. If these examples of applications of the method according to the invention are based, for example, on twenty double signals, corresponding to a code of 20 double-signal features, then for example $2^{20}=1,048,576$ overriding order combinations can be produced. Naturally any other mathematical grouping can be effected within these twenty code features.

It is here also possible inter alia again to combine the double-signal features at least partially to form overriding double-signal pairs which act on an associated synchronous selector receiver co-operating with the double-signal pitch, in which the individual signal pitch corresponds to the overriding double-signal pitch.

The arrangement according to the invention for carrying out the method according to the invention will be more fully explained with reference to examples:

FIGURE 3 shows a receiving arrangement in which the incoming impulses actuate a holding relay K1 the armature of which is adapted to be returned after a predetermined time by a second holding relay K2, the testing function at the position of the contact $k1$ of the first holding relay K1 and the function of monitoring at the return to the contact $k2$ of the second holding relay K2 being effected by means of a program-controlled make-and-break contact P. The first and second holding relays K1 and K2 are designed in combination as a switching relay K.

The arrangement operates as follows:

The incoming audio-frequency impulses are filtered out by a resonant circuit R, the inductance of which is designed, for example, as a relay comprising the contact $r$. This constitutes a known arrangement wherein the circuit combination of the relay inductance and series capacitance is tuned to the frequency of the order impulses but de-tuned to the regular power frequency. The circuit thus resonates in the presence of an order impulse and the resonant current actuates the relay, thus closing contact $r$. Each time an order impulse occurs the relay R closes. The contact $f$ will be assumed first of all to be closed.

When an order impulse arrives at the receiving station, the contact $r$ is closed. A coil K1 of the switching relay K is thereby energized and the contact thereof is changed over to $k1$.

At the commencement of the transmission of a program, as illustrated for example in FIGURE 1, a synchronous motor starts in known manner through the self-holding contact $sk$ controlled by a cam $n$. This synchronous motor actuates a cam contact P, the cam disc being so designed that the contact arm of the cam contact is alternately changed over to the contacts $p1$ and $p2$. When it is applied to $p2$, the coil K2 of the switching relay K is energized and the contact thereof is applied to $k2$. The cam is so designed that it tests $p1$ at the end of a double signal interval to ascertain whether the contact of the switching relay K lies on $k1$ or $k2$. If the former is the case, a control impulse has arrived during the double signal concerned and the change-over relay U is energized, and its contact is changed over. The cam is in addition so designed that when the testing of $p1$ has been completed the cam contact is immediately changed back to $p_2$ at the commencement of the next double signal, so that the contact arm of the switching relay K again lies on $k2$ and the readiness for testing of the switching relay is restored. The described process will again be best understood by reference to the impulse diagrams A, B, C and D of FIGURE 2, in which the correct sequence of the contact positions $r$, $k1$, $k2$, $p1$, $p2$, $u1$ and $u2$ is illustrated.

When an impulse diagram $A_1$ according to FIGURE 2 arrives at the receiving station in the arrangement just described, the contact positions $u1$, $u2$ corresponding to the diagram $D_1$ result, as will readily be understood with reference to FIGURE 3.

On the other hand, if an impulse series according to diagram $A_2$ of FIGURE 2 reaches the receiving station, a contact position diagram $u1$, $u2$ according to $D_2$ is obtained.

When the change-over contact U actuates, for example, the driving motor of an air-raid warning siren L, this sounds in a rhythm with the double-signal position throughout a direct order repetition program according to $A_0$ of FIGURE 2, as indicated by diagram D. On the other hand, when the repetition impulse of the double signal 7 arrives, but the succeeding impulses are suppressed with the exception of the repetition impulse of the double signal 16, the siren L thus sounds from the instant of the double signal 7 and stops again at the end of the double signal 16. The process according to the example of diagrams $A_2$ and $D_2$ of FIGURE 2 can also be followed directly by reference to the arrangement described in FIGURE 3. If the changeover relay U is replaced by a simple pull-up relay according to FIGURE 4, there is obtained upon arrival of an impulse series according to diagram $A_2$ of FIGURE 2 at the receiving station, with the aid of the arrangement according to the invention, a contact diagram $u$ for the last-mentioned relay according to diagram $E_2$ of FIGURE 2.

FIGURE 5 shows a similar example of the arrangement according to the invention, in which the relays U of FIGURE 3 are replaced by a switching relay $K_{10}$, which is now actuated through the contacts $k_1$ and $k_2$. In other respects, the arrangement operates in exactly the same manner as described with reference to FIGURE 3, the contact $f$ here again first being assumed to be bridged. When a direct order repetition series corresponding to diagram $A_3$ of FIGURE 2 arrives at the arrangement according to FIGURE 5, in which series the repetition impulses of the double signals 8, 11, 12, 14 and 16 are thus suppressed, a contact-closing pattern $K_{11}$, $K_{12}$ according to diagram $D_3$ of FIGURE 2 is obtained in the operation of the cam contact P described with reference to FIGURE 3. If the presence of one repetition impulse per double signal is designated by "+" and the absence of an impulse per double signal, or the suppression thereof, is desgnated by "—," there is thus obtained a program allocated to these double-signal features, with which, for example, two signal lamps $St$ can be alternately lit up for short and long periods.

If the switching relay $K_1$ in the arrangement described in FIGURE 5 is replaced by a polarized relay $K_2$ having the contacts $k_{21}$, $K_{22}$, as diagrammatically illustrated in FIGURE 6, there will be produced on the arrival of an impulse series $A_3$ in the arrangement according to the invention a contact-closing diagram $E_3$ according to FIGURE 2 which is similar to a telegraph code, and which can also be directly followed with reference to FIGURE 5. For example, a printing device can be controlled in accordance therewith.

FIGURE 7 shows an impulse combination evaluating arrangement known per se. If this arrangement is connected to the contact $k_1$ and if the selector contact pitch corresponds to the double-signal pitch, a chain of contacts is closed, and a desired special order is thus emitted, on arrival of a particular combination, which can be produced by suppression of impulses in the direct order repetition signal.

FIGURE 8 shows by way of example a construction of the cam disc of the pole changer P, which is so designed that the contact control lever is held for a predetermined time in a constant central position between the closing times of the make-and-break contact, and that the contact-closing takes place only for a short time at the beginning and at the end of a double-signal interval, for example, in accordance with diagram C of FIGURE 2.

It is in some cases desirable, as indicated in FIGURES 3 and 5, to prevent operation of the arrangement according to the invention at certain times and to release it for the reception only at certain alram times. This may be effected with the aid of a receiver E, FIGURE 5 and $E_M$, FIGURE 3 known per se, which is designed, for example, as a known combination or group receiver which controls an associated release relay F and the associated release contact $f$. Upon receipt of a special order combination the receiver E, $E_M$, deenergizes relay F thus opening contact $f$ and thereby preventing the special switching orders carried out by relay V, FIGURE 3 or $K_{10}$, FIGURE 5.

The method according to the invention and the arrangement according to the invention permit of providing in addition many control possibilities of various forms in central remote-control systems known per se. A particularly important feature is that the large number of simple receiving arrangements is not thereby affected, since, as has been shown, new additional control orders can be produced simply by certain variations in the direct order repetition program of the large number of receivers, and these orders can at any time be carried into effect at the required place by the use of arrangements according to the invention.

Moreover, no complicated technical steps are necessary at the transmission end for the desired impulse suppression in the course of the direct order repetition programs. The method according to the invention therefore constitute a substantial technical and economic advance in the field of mains-superposition central remote control.

What we claim is:

1. In combination with broadcast control installations operating in accordance with the synchronous selector principle and utilizing double signal orders, apparatus for providing the implementation of extraordinary orders comprising detecting means actuated by the presence of an order in any of a plurality of double signal intervals, restoring means actuated during a discrete period in each of said double signal intervals, switching means responsive to said detecting means and said restoring means, monitoring means actuated in synchronism with said synchronous selector during each of said double signal intervals, said monitoring means controlling said restoring means during said discrete periods and also energizing said switching means during a certain discrete period of each of said double signal intervals, and output control means responsive to said switching means.

2. Apparatus, according to claim 1, in which said detecting means is a relay.

3. Apparatus, according to claim 1, in which said output control means is a changeover relay.

4. Apparatus, according to claim 1, in which said output control means is a voltage relay operating from a zero position.

5. Apparatus, according to claim 1, in which said output means is a switching relay.

6. Apparatus, according to claim 1, in which said output means is a polarized relay operating from a zero position.

7. Apparatus, according to claim 1, in which said detecting means, restoring means and switching means comprise the two fields and armature respectively of a switching relay.

8. Apparatus, according to claim 1, in which said monitoring means comprises a cam disc driven by a synchronous driving motor throughout the double signal program.

9. In combination with broadcast control installations operating in accordance with the synchronous selector principle and utilizing double signal orders, apparatus for providing the implementation of extraordinary orders comprising, means responsive to the transmissions of said broadcast control installation for detecting the presence of double signal orders, said double signal orders being characterized by two discrete time intervals, switching means responsive to said detecting means, synchronous discrete time interval marking means and means interconnected with said switching means for periodically sampling the condition of said switching means during double signal intervals of said transmission, restoring means coupled to said switching means for periodically returning said switching means to a reference condition and output means responsive jointly to said sampling means and said switching means when said switching means attain a predetermined condition for signaling said extraordinary orders.

10. Apparatus according to claim 9, in which said restoring means are energized by said sampling means, said sampling and restoring actions each occurring once during each double signal interval.

11. Apparatus according to claim 9, in which said detecting means, restoring means and switching means comprise respectively the two fields and armature of relay means.

References Cited in the file of this patent
UNITED STATES PATENTS

| | | |
|---|---|---|
| 1,924,795 | Lipman et al. | Aug. 29, 1933 |
| 2,229,097 | Koenig | Jan. 21, 1941 |
| 2,562,176 | Curry | July 31, 1951 |
| 2,568,836 | Tobler | Sept. 25, 1951 |
| 2,588,767 | Roseby | Mar. 11, 1952 |

FOREIGN PATENTS

| | | |
|---|---|---|
| 193,446 | Switzerland | Oct. 15, 1937 |
| 824,957 | France | Nov. 18, 1937 |
| 555,664 | Great Britain | Sept. 1, 1943 |
| 271,755 | Switzerland | Feb. 16, 1951 |